US008689646B2

(12) United States Patent
Carr

(10) Patent No.: US 8,689,646 B2
(45) Date of Patent: Apr. 8, 2014

(54) SEALED, SLIM-LINE CONSTANT FORCE, GENERATION UNIT

(76) Inventors: Jon Carr, Houston, TX (US); Cynthia Kriesmer Carr, legal representative, Houston, TX (US)

( * ) Notice: Subject to any disclaimer, the term of this patent is extended or adjusted under 35 U.S.C. 154(b) by 277 days.

(21) Appl. No.: 13/359,062

(22) Filed: Jan. 26, 2012

(65) Prior Publication Data

US 2012/0234106 A1 Sep. 20, 2012

Related U.S. Application Data

(60) Provisional application No. 61/436,304, filed on Jan. 26, 2011.

(51) Int. Cl.
*G01L 1/08* (2006.01)

(52) U.S. Cl.
USPC .......... 73/862.61

(58) Field of Classification Search
USPC .......... 73/862.61
See application file for complete search history.

(56) References Cited

U.S. PATENT DOCUMENTS

| | | | | |
|---|---|---|---|---|
| 3,552,695 | A * | 1/1971 | Liesegang | 248/589 |
| 3,588,010 | A * | 6/1971 | Liesegang | 248/542 |
| 5,018,700 | A * | 5/1991 | Hardtke | 248/571 |
| 7,252,277 | B2 * | 8/2007 | Sweere et al. | 248/371 |
| 8,152,126 | B2 * | 4/2012 | Hardtke | 248/584 |
| 8,286,927 | B2 * | 10/2012 | Sweere et al. | 248/297.21 |
| 8,474,795 | B2 * | 7/2013 | Tjader | 254/280 |
| 8,596,591 | B2 * | 12/2013 | Theis et al. | 248/125.2 |
| 2004/0250635 | A1 * | 12/2004 | Sweere et al. | 74/1 R |
| 2005/0034547 | A1 * | 2/2005 | Sweere et al. | 74/1 R |
| 2006/0185563 | A1 * | 8/2006 | Sweere et al. | 108/28 |
| 2011/0278414 | A1 * | 11/2011 | Theis et al. | 248/297.11 |
| 2012/0069508 | A1 * | 3/2012 | Sweere et al. | 361/679.01 |
| 2013/0270499 | A1 * | 10/2013 | Tjader | 254/290 |

* cited by examiner

*Primary Examiner* — Freddie Kirkland, III
(74) *Attorney, Agent, or Firm* — McGuireWoods LLP

(57) ABSTRACT

The present disclosure relates to a sealed constant force generation system utilizing a spring system comprising a spring system housing unit, spacers, interchangeable spring load rod and conical spring washers, a puller assembly comprising a puller, pivot assembly, seal system and o-ring, a lever arm system, an adjustment system, a load stopper and fulcrum housing unit. A method for applying the sealed constant force generation system on objects or loads experiencing a specific displacement is also disclosed.

17 Claims, 7 Drawing Sheets

SEALED, SLIM-LINE CONSTANT FORCE, GENERATION UNIT

CROSS REFERENCE TO PRIOR APPLICATIONS

This application claims priority and the benefit thereof under 35 U.S.C. §119(e) from U.S. Provisional Application No. 61/436,304 filed Jan. 26, 2011 and entitled SEALED, SLIM-LINE CONSTANT-FORCE, GENERATION UNIT, the entire content of which is hereby incorporated herein by reference in its entirety.

FIELD OF THE DISCLOSURE

The present disclosure relates to a sealed constant force generation system utilizing a spring system comprising a spring system housing unit, spacers, interchangeable spring load rod and conical spring washers, a puller assembly comprising a puller, pivot assembly, seal system and o-ring, a lever arm system, an adjustment system, a load stopper and fulcrum housing unit. A method for applying the sealed constant force generation system on objects or loads experiencing a specific displacement is also disclosed.

BACKGROUND OF THE DISCLOSURE

In many industries various processes, equipment and loads have a need for a constant force to provide the necessary support as the equipment or loads undergo weight, spatial and/or thermally-induced changes or displacement. A constant force acts to counterbalance the changes or displacements and enables the supported item to move, for example, vertically or horizontally, without a change to the supporting force.

For example, one such constant force requirement is the field support for thermally changing equipment, such as support for piping associated with a tall cracker unit (i.e., high temperature vessel). During periods of shutdown, the unit cools, and the piping attached to the top of the unit may not be at the same or similar temperature as the associated unit. As the unit cools and contracts, a movement is imparted to the associated piping. In some cases, this movement can be quite large (in some cases up to ten (10) inches). Since the piping is connected to the unit, the piping must follow the motion occurring at its point of connection, or face tear or rupture at or near the connection point. Because of the possibility of movement, the entire piping system requires an independent and known force to support its weight. The weight of the piping is fixed, so the force needed to support the piping is also fixed. If the unit thermally expands and imparts motion to the associated piping system and the constant force generator may be fouled or corroded, preventing its proper operation and the piping may be subjected to adverse and damaging stresses that could lead to premature and catastrophic piping failure.

Existing constant force technologies used to load balance include conventional large coiled type spring system and components which are machined and welded together to form one constant force unit, such as shown in FIG. 1. These technologies require large and heavy geometric configurations to drive the spring system. The machined and welded constant force unit requires extra attention and care of component alignment, machining time and tolerances during production.

Using existing constant force systems, a specific fixed geometric configuration is required for each load rating, such as shown in FIG. 6A. A specific constant force unit is required for a specific load rating, thus each unit has to be precisely fabricated, assembled and inventoried. With well over one hundred published load ratings, current art requires significant warehousing and fabrication demands and associated longer lead times to support a growing demand for the existing technologies.

Additionally, due to the use of large coiled spring systems and the associated support geometry, as well as fabrication procedures, a large number of unit configurations are required to support a wider range of unit loadings. Hence, to change output force values that might be necessary due to external process changes or displacements, a complete unit change-out may be required. The use of different units to support differing loadings may require a large stock of unit configurations to be held in inventory, thereby imposing costly warehousing requirements.

Existing constant force spring generating systems expose critical internal components, such as the spring coils, to adverse environmental conditions, as shown in FIG. 2. Often, the result of an exposed force spring generating system is a degradation of system performance due to component corrosion and fouling of the force generating system (i.e., spring coils) caused by corrosion, air-borne foreign particulates, and rain, snow, ice, or wind over time. The exposure of these internal systems may serve to reduce their useful life expectancy, degrade system performance over time, as well as negatively impact system safety. These systems may require significant ongoing maintenance, cleaning and/or replacement due to the corrosive damage, fouling and other environmental factors. Also, an exposed force spring generating system may limit the usefulness of such a system for use in undersea or under water applications where significant water corrosion damage may occur.

A need exists for a constant force generator with a single geometric configuration and interchangeable component design that can service a wide range of loads undergoing weight, spatial and/or thermally-induced changes or displacement. A need also exists for a constant force generator whose critical components are sealed, thereby minimizing its exposure to unfavorable environmental conditions. A need also exits for a smaller, less bulky, more compact constant force generator than current technologies.

SUMMARY OF THE DISCLOSURE

According to one non-limiting example of the disclosure, a constant force generation system is comprised of a sealed, reduced weight, single geometric configuration, with selective interchangeable component designs that can service a wide range of load ratings. A tab and slot configuration is also disclosed as a preferred interlocking mechanism for use in the constant force generation system. Further, a method for applying a constant force generation system on objects experiencing a specific positional displacement is also provided herein.

This disclosure provides a simplified single geometric configuration that can support a wide range of load ratings by providing a means for changing the output force of the system without a need to replace the entire system. To provide such a constant and dependable force, the disclosure operates using a sealed spring system with a specialized lever-arm system that outputs a constant force during lever-arm travel.

The disclosure is of a constant force generation system which includes a spring system comprising a spring load rod; conical spring washers; spacers, and spring system housing unit; a puller assembly comprising a puller rod, pivot assembly, seal system, and o-ring; a lever arm system; an adjustment system; a load stopper; and a fulcrum housing unit. The materials comprising the disclosure may be high carbon steel, stainless steel, or other kinds of appropriate metals and synthetics.

In the disclosure, the spring system may be detachable from the rest of the system. The puller rod, spring load rod, and the conical spring washers may be interchangeable and may be manipulated to best offset the load displacement. The preferred configuration of the disclosure uses Belleville washers and Belleville spacers as the spring system components. One or more Belleville washers may be combined to form a small and compact Belleville spring stack. This type of spring system, as compared with the use of large coiled spring systems, reduces the geometric size of the compact force generation system and may result in a substantial weight and size reduction over the prior art.

Unlike the prior art, this disclosure provides a technique to handle a large range of load ratings. By providing a screwed, interchangeable puller rod and interchangeable Belleville spring systems, the load rating of any unit may be changed in place without the need for special tools. The reduced weights of the spring system and puller rod enables changing of the load range change without lifting or using any additional lifting support equipment. The load range change may be accomplished in a matter of minutes due to design simplicity, and may improve maintenance safety due to the elimination of lifting support equipment use.

This disclosure also provides for a sealed system. The spring system components may be protected from external environmental conditions by a spring housing unit that houses the spring components and a seal system and o-ring that securely seals the ends of the spring system and attaches it to the puller rod. Environmentally exposed components, including the housing unit, may be constructed of stainless steel to control corrosion and extend the service life of the units. A sealed spring system with such corrosion resistant design may eliminate force generating system corrosion and fouling while further protecting all other components from corrosion. Even after a load range change, the unit's sealing system remains intact.

A sealed constant force generation system that may be configured with an interlocking mechanism that includes one or more tab fasteners in one component configured to fasten with at least one or more counterpart slots in another component is also provided. A preferred fastening mechanism includes a tab and slot configuration. Each component in the disclosure may contain a tab and/or slot in order for the components to properly align and then snapped together and welded for rapid assembly. An interlocking mechanism may be used to fasten the spring system housing unit with seal system, the spring load rod with the seal system, the pivot assembly with the seal system and puller rod with the o-ring. Such locking mechanism supports on-demand assembly, assure tolerances and can accelerate delivery. Other fastening mechanisms envisioned for each of the components in the sealed constant force generation system may include hooks, bolts, nuts, clips, clamps, pins and rods.

In one aspect, a sealed constant force generation system for applying a constant force to a load experiencing displacement includes a sealed spring system comprising components including a spring load rod, a plurality of spring washers, a plurality of spacers, and spring system housing, a puller assembly comprising a puller rod, pivot assembly and seal system and a lever arm mechanism connectable to a fulcrum and connectable to a load, wherein the puller assembly is configured to compress the sealed spring system to deliver an output force to the lever arm thereby applying a constant force to the load connected to the lever arm, and wherein one or more of the components is configured to be replaceable to provide a variety of load ratings for a single geometric configuration of the constant force generation system.

In another aspect, a method for applying a constant force generation system on objects or loads that may experience a displacement includes the steps of providing a sealed constant force generation system that includes a predetermined configuration for a spring load rod and a predetermined number, size and shape of conical spring washers for a load, positioning the sealed constant force generation system to a support and counterbalancing any load displacement by adding, removing and/or replacing an interchangeable part including at least any one of: a spring load rod and a conical spring washer.

The benefits of the disclosure include an interchangeable single geometric configuration providing a reduction in inventory requirements and costs, support of in-place load rating modification and acceleration of product delivery. The components in the disclosure may be cut by a laser fabrication process and thereby also offering fabrication advantages. All components are like-designed and can be stored unassembled and unwelded as needed, thereby generating a significant reduction in storage space requirements. Also, with use of tab and slot interlocking mechanisms, rapid assembly and welding is assured due to the reduced requirement of alignment and layout for tolerancing.

In another aspect, a method of providing a constant force for applying a constant force to a load experiencing displacement includes the steps of providing a spring system comprising components including a spring load rod, a plurality of spring washers, a plurality of spacers, and spring system housing, providing a puller assembly comprising a puller rod, pivot assembly and seal system and providing a lever arm mechanism connectable to a fulcrum and connectable to a load, wherein the puller assembly is configured to compresses the spring system to deliver an output force to the lever arm thereby applying a constant force to the load connected to the lever arm, and wherein one or more of the components is configured to be replaceable to provide a variety of load ratings for a single geometric configuration of the constant force generation system.

Additional features, advantages, and embodiments of the disclosure may be set forth or apparent from consideration of the detailed description and drawings. Moreover, it is to be understood that the foregoing summary of the disclosure and the following detailed description and drawings are exemplary and intended to provide further explanation without limiting the scope of the disclosure as claimed.

BRIEF DESCRIPTION OF THE DRAWINGS

The accompanying drawings, which are included to provide a further understanding of the disclosure, are incorporated in and constitute a part of this specification, illustrate embodiments of the disclosure and together with the detailed description serve to explain the principles of the disclosure. No attempt is made to show structural details of the disclosure in more detail than may be necessary for a fundamental understanding of the disclosure and the various ways in which it may be practiced. In the drawings:

FIGS. 1, 2 and 6A identify the prior art. FIG. 2 shows a bottom view of the prior art constant force generator of FIG. 1, with the spring system exposed to the environment; and FIG. 6A shows a cross-sectional side view of a prior art constant force generator attached to a lever arm system with a downward load. The entire prior art system as shown in FIG. 6A would need to be replaced for each specific load rating.

Figure 1:
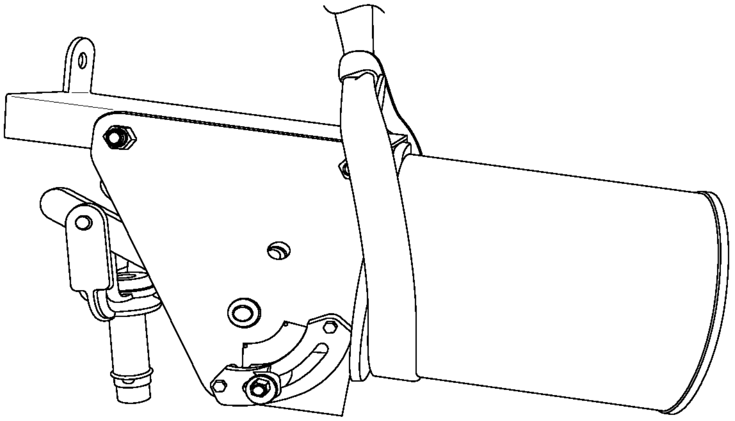
FIG. 1 shows a perspective side view of a prior art constant force generator.
Figure 2:
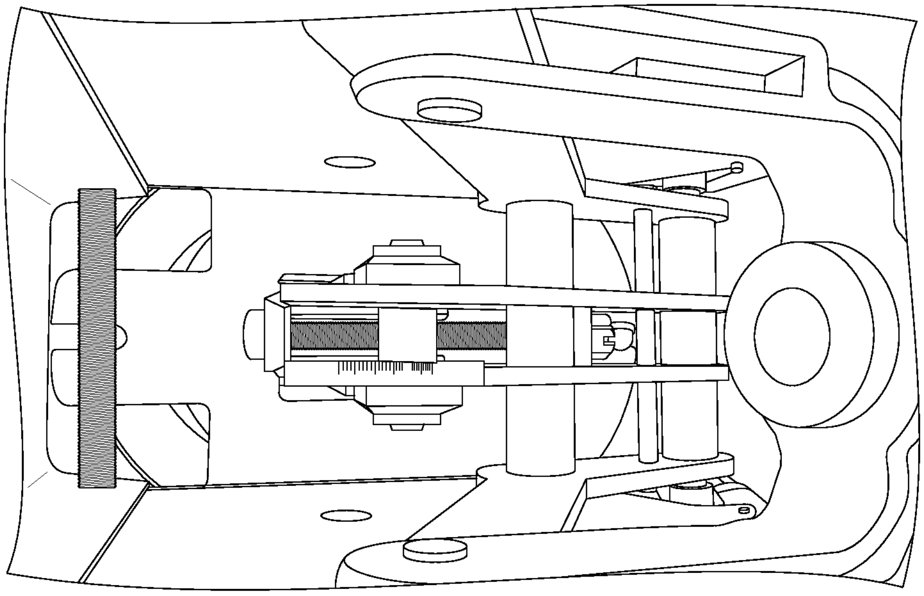
FIG. 2 shows a bottom view of the prior art constant force generator of FIG. 1.

The present disclosure is further described in the detailed description that follows.

DETAILED DESCRIPTION OF THE DISCLOSURE

The disclosure and the various features and advantageous details thereof are explained more fully with reference to the non-limiting examples that are described and/or illustrated in the accompanying drawings and detailed in the following description. It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments of the disclosure. The example used herein is intended merely to facilitate an understanding of ways in which the disclosure may be practiced and to further enable those of skill in the art to practice the embodiments of the disclosure. Accordingly, the examples herein should not be construed as limiting the scope of the disclosure. Moreover, it is noted that like reference numerals represent similar parts throughout the several views of the drawings.

Figure 3:
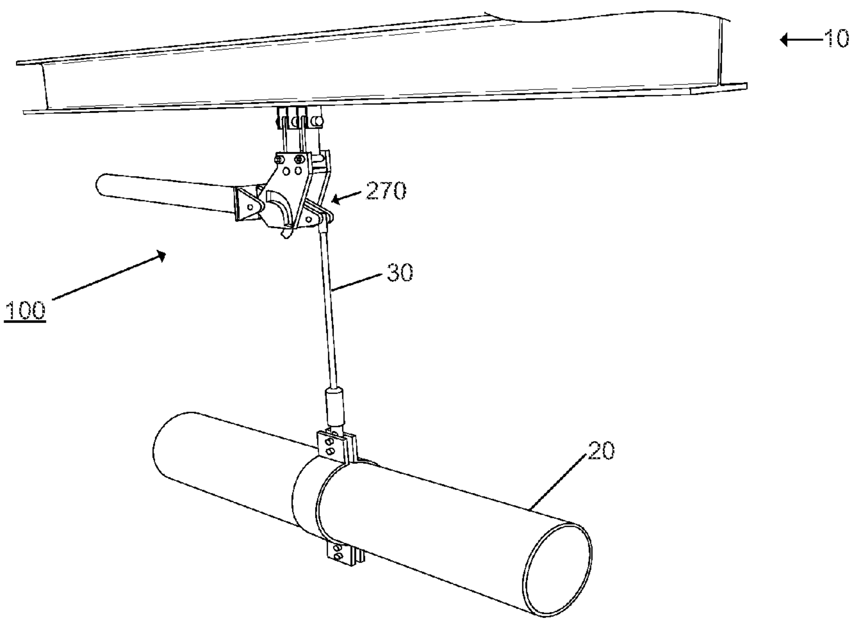
FIG. 3 shows a perspective side view of a sealed constant force generation system attached to a top beam and balancing a load, configured according to principles of the disclosure.

FIG. 3 shows a perspective side view of a sealed constant force generation system 100 attached to a top beam 10 and balancing a load 20, configured according to principles of the disclosure. The load 20 is attached to an external load rod 30 which attaches to a lever arm 270. The lever arm 270 travels as the load 20 travels. This traveling lever arm 270 actuates a small, interchangeable and sealed spring system 200 (FIG. 4) which in turn is configured to provide a constant force output.

Figure 4:
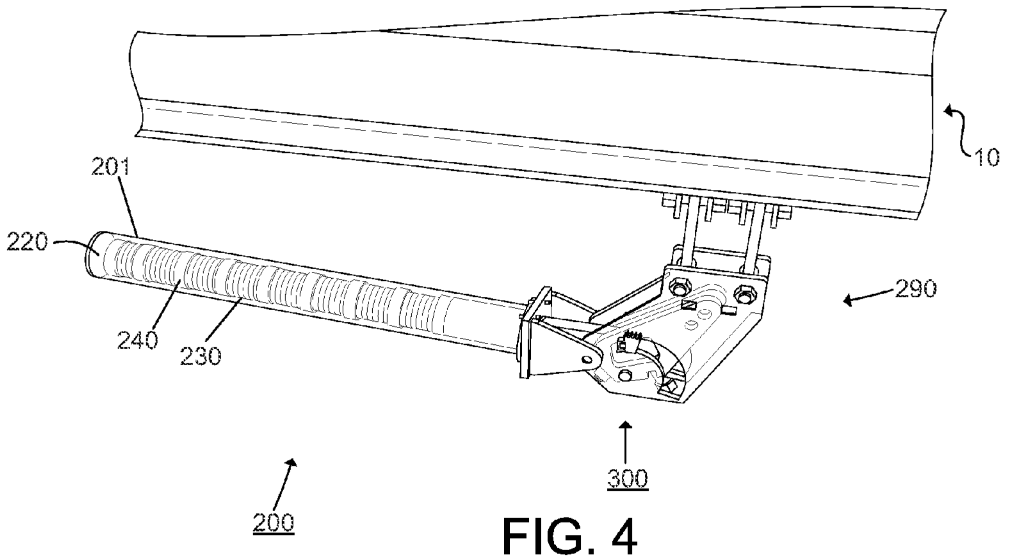
FIG. 4 shows a perspective cross-sectional side view of the sealed constant force generation system of FIG. 3.

FIG. 4 shows a perspective cross-sectional side view of the sealed constant force generation system 100 of FIG. 3. In FIG. 4, the cross-sectional view offers visibility to the interchangeable spring system 200 including a spring load rod 220, conical spring washers 230 (which may be frusto-conical washers), spacers 240, and spring system housing unit 201; a puller assembly system 300, lever arm 270 and a fulcrum housing unit 290.

Figure 5:
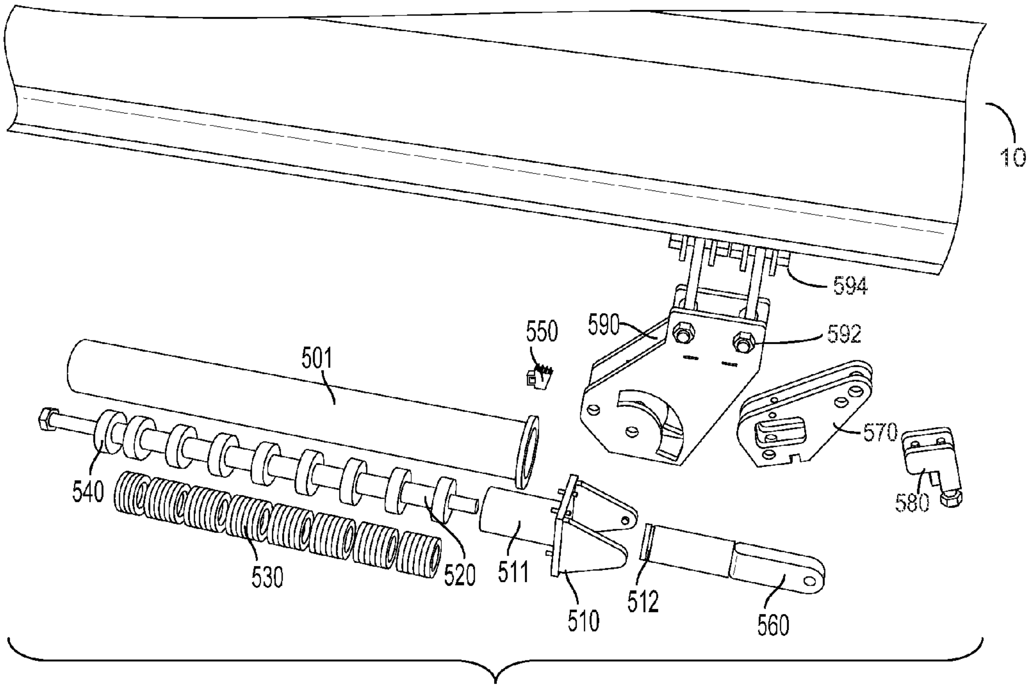
FIG. 5 shows a magnified and separated view of the individual components of the sealed constant force generation system of FIG. 3.

FIG. 5 shows a magnified and separated view of the individual components of the sealed constant force generation system 100 of FIG. 3. Referring to FIG. 5 (and FIG. 3), the sealed constant force generation system 100 is energized by loading the external load rod 30 attached to the load 20. The external load rod 30 may be configured to attach to the lever arm 570. The lever arm 570 may be pinned or otherwise fastened to the puller assembly 300 at the puller rod 560. The puller assembly 300 comprises a puller rod 560 that may be equipped with an o-ring 512 that extends into the pivot assembly 510 and seal system 511. The o-ring 512 effectively provides environmental sealing by sealing the area between the puller rod 560 and pivot assembly 510. The final seal is produced by interlocking the spring system housing unit 501 with the seal system 511 to the pivot assembly 510.

The spring load rod 520 may be threaded into the puller assembly 300 that pulls and loads the washers 530. The spring load rod 520 and washers 530 are comparable in functionality to (and substitutes for) a coiled spring system. This action compresses the sealed spring system 200, which in turn delivers an output force to the lever arm 570. The specially configured lever arm 570, fulcrum housing unit 590 and pivot assembly 510 ensure that during load travel the output force remains constant. The spring load rod 520 and washers 530 are readily changeable and can be adapted to the desired output force, as needed for an application.

A travel positioner 550 may lock the spring system 200 securely in the desired position and may fix the lever arm 570 in place, regardless of load travel. The adjustment system 580 attaches to the lever arm 570 and the external load rod 30, and may be configured to allow load adjustment during operation of the sealed constant force generation system 100. Turning the adjustment system 580 may adjust the load 20 by approximately plus or minus ten percent (+/−10%) of the frill and constant output force for the entire travel range. The fulcrum housing unit 590 may be attached to the wall, ceiling, pipe, beam or other structure by fastening mechanisms 592, 594.

Figure 6A:
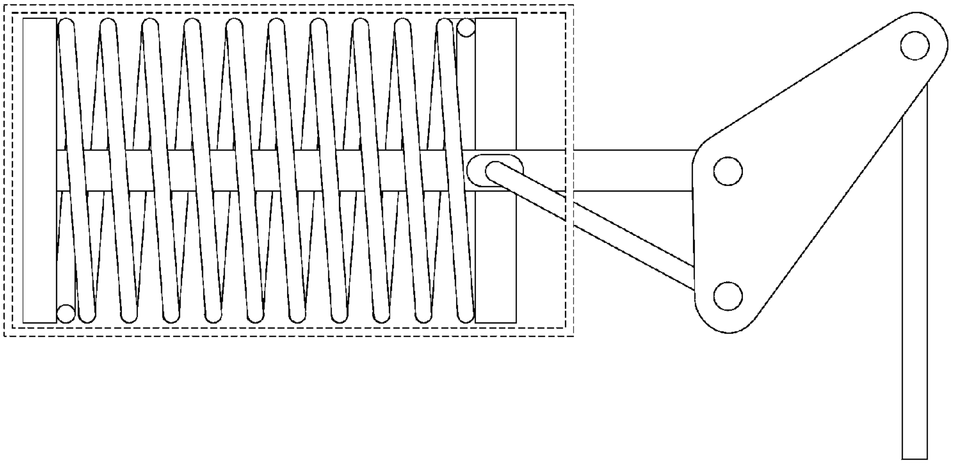
FIG. 6A shows a cross-sectional side view of a prior art constant force generator attached to a lever arm system with a downward load.
Figure 6B:
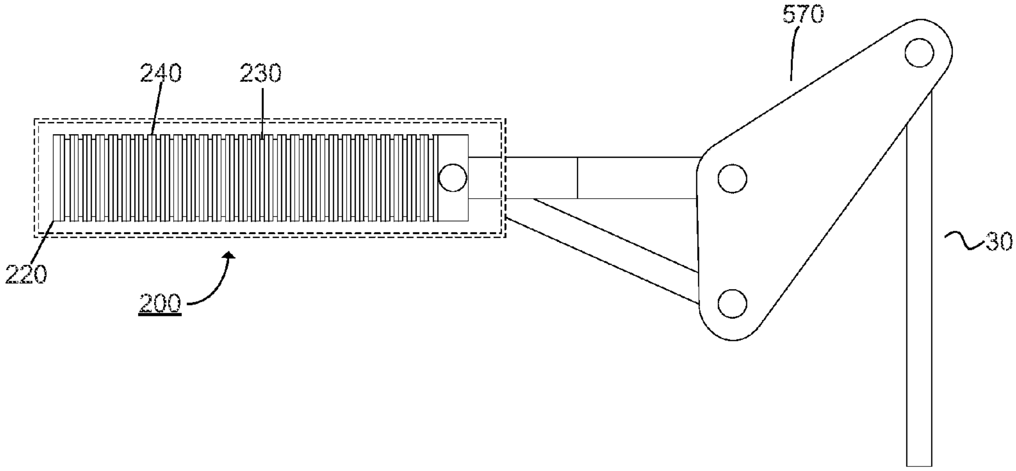
FIG. 6B shows a side view of the spring system of the sealed constant force generation system comprising a spring load rod and conical spring washers with a downward external load rod, configured according to principles of the disclosure.
Figure 7:
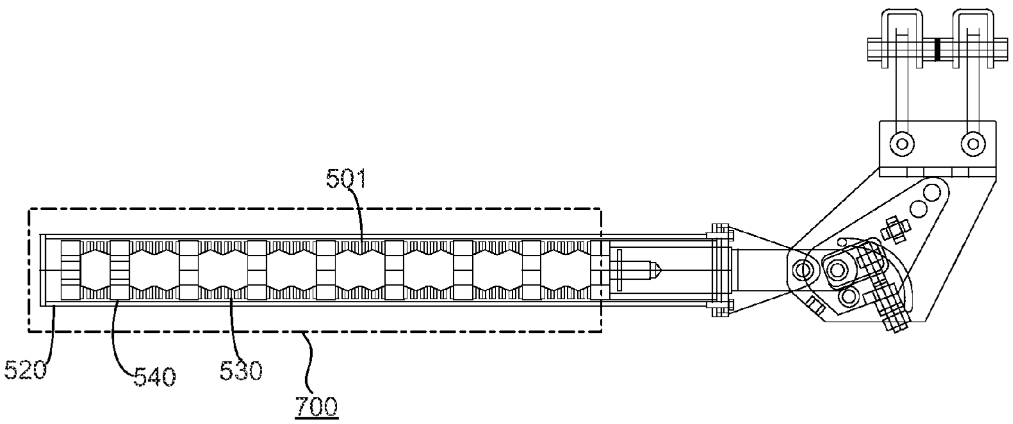
FIG. 7 shows a cross sectional side view of the spring system of the sealed constant force generation system of FIG. 6B.

FIG. 6B shows a side view of the spring system 200 of the sealed constant force generation system 100 comprising a spring load rod 220, conical spring washers 230 and spacers 240 with a downward external load rod 30 configured according to principles of the disclosure. FIG. 7 shows a cross-sectional side view of the spring system 200 of the sealed constant force generation system 100 of FIG. 6B. The dotted line 700 in FIG. 7 shows the components such as the spring system housing unit 501, spring load rod 520, washers 530, and spacers 540 that may be interchanged/replaced (usually in the field) to best provide the sealed constant force generation system 100 with a variety of load rating for a single geometric configuration. The interchangeable washers 530 may be Belleville washers, for example. This interchangeability may greatly reduce warehousing, improve delivery, and promote reusability since any spring system 200 may be reconfigured for use at other locations in lieu of system retirement and disposal, for example.

Figure 8A:
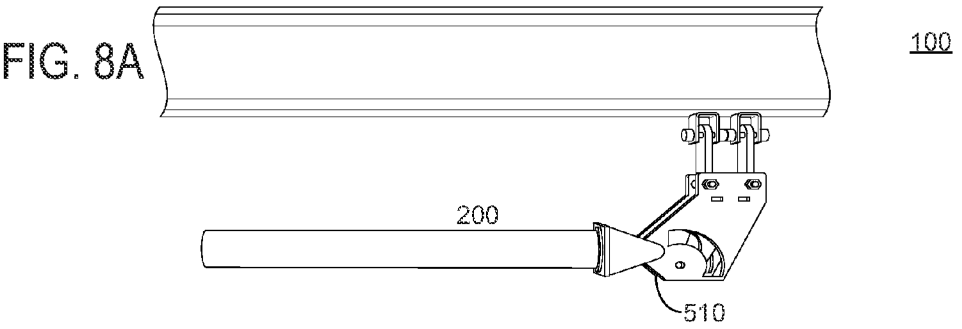
FIG. 8A shows a position of the sealed constant force generation system with no load, configured according to principles of the disclosure.

FIG. 8A shows a position of the sealed constant force generation system 100 with no load. With no load, the spring system 200 is idle and lies in a horizontal position because a constant force is not required. The puller rod 560 resides inside the fulcrum housing unit 590 when not attached to an external load rod 30.

Figure 8B:
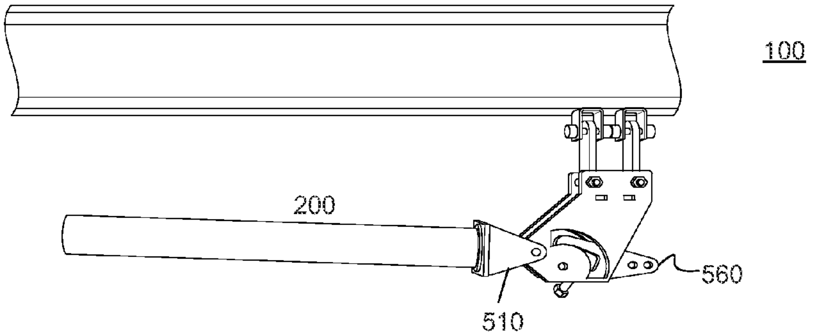
FIG. 8B shows a position of the sealed constant force generation system balancing a load, configured according to principles of the disclosure.

FIG. 8B shows a position of the sealed constant force generation system 100 when balancing a load. With some load (such as load 20) attached to the external load rod 30 (not shown), the spring system 200 pivots at a slightly upwards angle from the pivot assembly 510 and the puller rod 560 rotates to a slightly downward angle from the pivot assembly 510. The external load rod 30 may be in a perpendicular position relative to the puller rod 560.

Figure 8C:
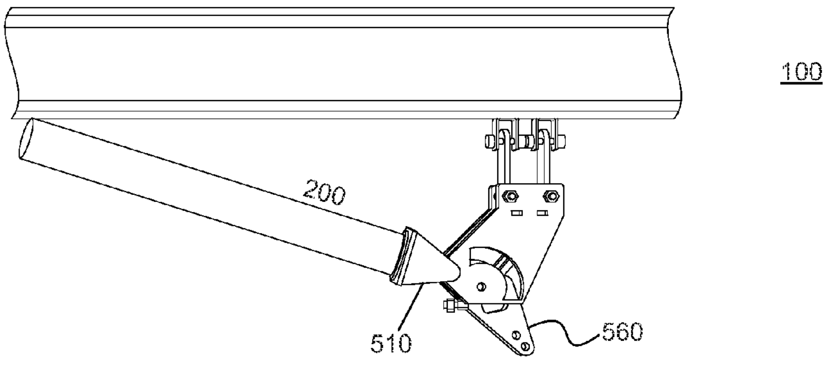
FIG. 8C shows a position of the sealed constant force generation system balancing a full load, configured according to principles of the disclosure.

FIG. 8C shows a position of the sealed constant force generation system 100 balancing a full load. With a heavy load attached (such as load 20) to the external load rod 30 (not shown), the spring system 200 pivots at a more inclined upward angle from the pivot assembly 510 until it reaches the travel positioner 550, or until it contacts with the support structure 10 which will stop the spring system 200 from moving further upwards. The puller rod 560 points at an increased downward angle from the pivot assembly 510.

Figure 9:
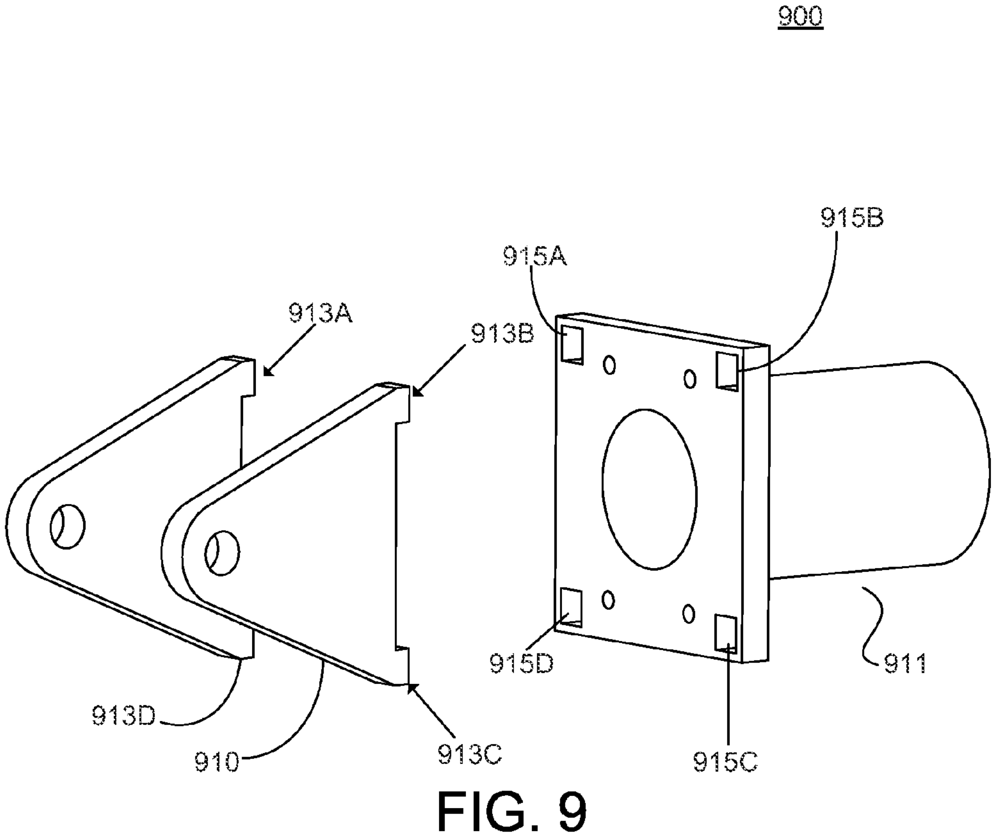
FIG. 9 shows an example of a tab and slot design configuration as an interlocking mechanism for connecting the pivot assembly and the seal system, configured according to principles of the disclosure.

FIG. 9 shows an example of a tab and slot design configuration 900 as the preferred interlocking mechanism for connecting the pivot assembly 910 and the seal system 911, according to principles of the disclosure. Referring to FIG. 9, the pivot assembly 910 may be configured with tabs 913A, 913B, 913C and 913D (not shown). The seal system 911 is configured with counterpart slots 915A, 915B, 915C and 915D. The tab and slot design configuration 900 may provide a very rapid, cookie-cutter component-by-component fabrication using a laser process. The tab 913A, 913B, 913C and 913D, and slot 915A, 915B, 915C and 915D configuration enables each of the components to be snapped together at time of delivery. Once snapped together and proper alignment confirmed, the components may be quickly welded and assembled. This unique fabrication/assembly technology reduces warehousing while improves delivery. While FIG. 9 shows the tab and slot design configuration 900 for the pivot assembly 910 and seal system 911, it is envisioned that the tab and slot design configuration 900 may also be used to fasten the spring system housing unit 501 to the seal system 911 the spring load rod 520 to the seal system, the pivot assembly 910 to the O-ring 512, as well as used to fasten a number of other components in the sealed constant force generation system 100.

While the disclosure has been described in terms of examples, those skilled in the art will recognize that the disclosure can be practiced with modifications in the spirit and scope of the appended claims. These examples are merely illustrative and are not meant to be an exhaustive list of all possible designs, embodiments, applications or modifications of the disclosure.

What is claimed:

1. A sealed constant force generation system for applying a constant force to a load experiencing displacement, the system comprising:

a sealed spring system comprising components including a spring load rod, a plurality of spring washers, a plurality of spacers, and spring system housing;

a puller assembly comprising a puller rod, pivot assembly and seal system; and a lever arm mechanism connectable to a fulcrum and connectable to a load, wherein the puller assembly is configured to compress the sealed spring system to deliver an output force to the lever arm thereby applying a constant force to the load connected to the lever arm, and wherein one or more of the components is configured to be replaceable to provide a variety of load ratings for a single geometric configuration of the constant force generation system.

2. The sealed constant force generation system of claim 1, wherein the one or more components is a plurality of the components that are each interchangeable to provide a variety of load ratings.

3. The sealed constant force generation system of claim 1, further comprising an adjustment system to allow load adjustment during operation of the sealed constant force generation system.

4. The sealed constant force generation system of claim 1, wherein the plurality of spring washers comprise a plurality of Belleville washers.

5. The sealed constant force generation system of claim 1, wherein the plurality of spacers comprise a plurality of Belleville spacers.

6. The sealed constant force generation system of claim 1, further comprising an interlocking mechanism comprising one or more tab fasteners in one component configured to fasten with at least one or more counterpart slots in another component.

7. The sealed constant force generation system of claim 6, wherein the interlocking mechanism is configured to fasten at least one of:

a) a spring system housing unit with a seal system, b) a spring load rod with a seal system, and c) a pivot assembly with a seal system.

8. The sealed constant force generation system of claim 1, wherein the fulcrum includes a fulcrum housing unit configured to be attachable to a structure.

9. A method for applying a constant force generation system on objects or loads that may experience a displacement, the method comprising the steps of:

providing a sealed constant force generation system that includes a predetermined configuration for a spring load rod and a predetermined number, size and shape of conical spring washers for a load;

positioning the sealed constant force generation system to a support; and counter-balancing any load displacement by adding, removing and/or replacing an interchangeable part including at least any one of: a spring load rod and a conical spring washer.

10. A method of providing a constant force for applying a constant force to a load experiencing displacement, the method comprising the steps of:

providing a spring system comprising components including a spring load rod, a plurality of spring washers, a plurality of spacers, and spring system housing;

providing a puller assembly comprising a puller rod, pivot assembly and seal system; and providing a lever arm mechanism connectable to a fulcrum and connectable to a load, wherein the puller assembly is configured to compress the spring system to deliver an output force to the lever arm thereby applying a constant force to the load connected to the lever arm, and wherein one or more of the components is configured to be replaceable to provide a variety of load ratings for a single geometric configuration of the constant force generation system.

11. The method of claim 10, further comprising providing a plurality of the components that are each interchangeable to provide a variety of load ratings.

12. The method of claim 10, further comprising providing an adjustment system to allow load adjustment.

13. The method of claim 10, wherein the spring system comprises a sealed spring system.

14. The method of claim 10, wherein the plurality of spring washers comprise a plurality of Belleville washers.

15. The method of claim 10, wherein the plurality of spacers comprise a plurality of Belleville spacers.

16. The method of claim 10, further comprising providing an interlocking mechanism comprising one or more tab fasteners in one component configured to fasten with at least one or more counterpart slots in another component.

17. The method of claim 16, wherein the step for providing an interlocking mechanism provides an interlocking mechanism configured to fasten at least one of:

a) a spring system housing unit with a seal system, b) a spring load rod with a seal system, and c) a pivot assembly with a seal system.

* * * * *